Jan. 31, 1956  T. G. BROWN  2,733,311
VEHICLE CROSSING SIGNAL
Filed June 26, 1953
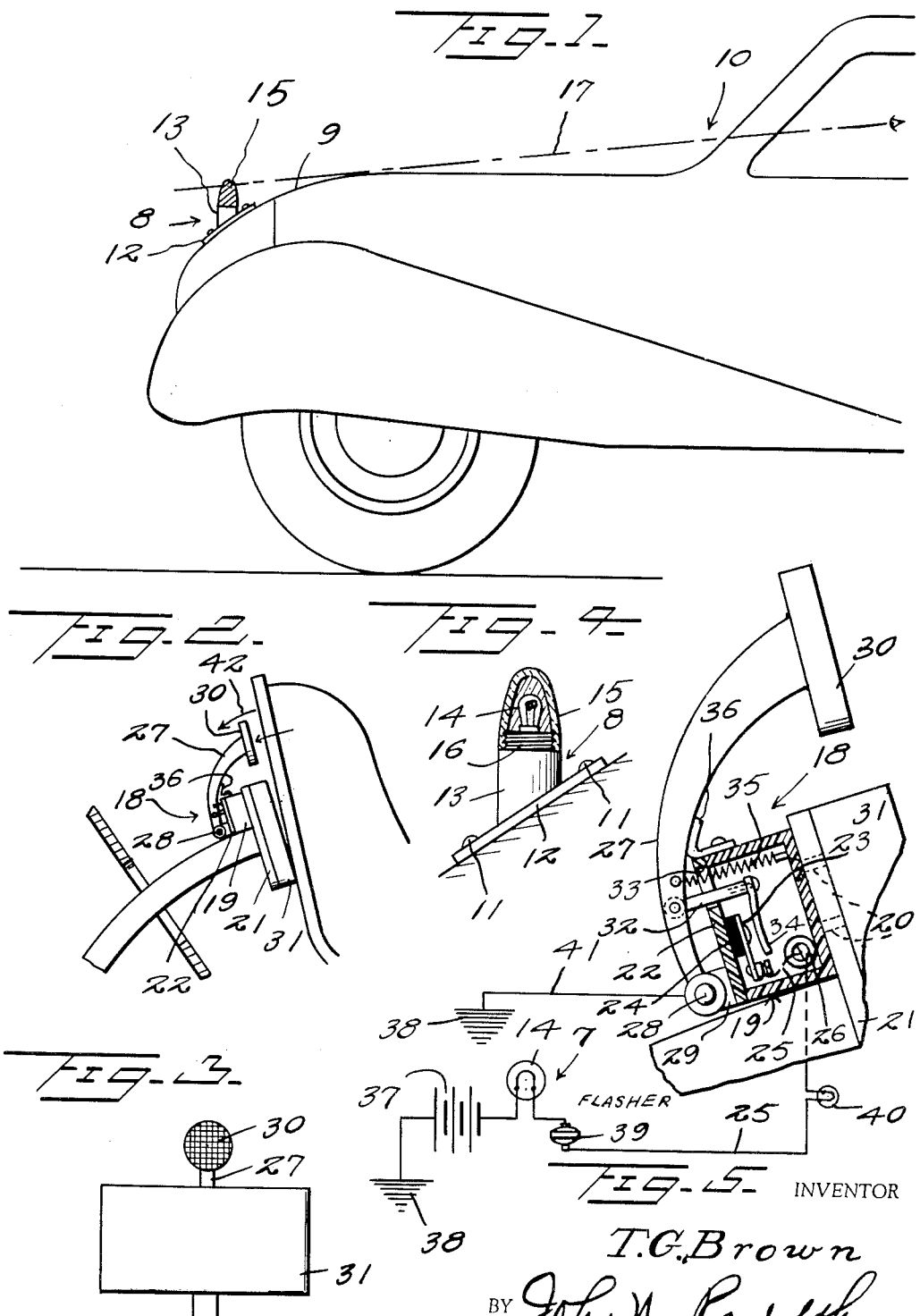
INVENTOR
T. G. Brown
BY John N. Randolph
ATTORNEY

United States Patent Office 2,733,311
Patented Jan. 31, 1956

2,733,311

VEHICLE CROSSING SIGNAL

Theodore G. Brown, Placerville, Calif.

Application June 26, 1953, Serial No. 364,298

1 Claim. (Cl. 200—61.89)

This invention relates to a novel illuminated signal for motor vehicles for indicating to operators of other motor vehicles and pedestrians when the driver of a vehicle equipped with the signal contemplates waiting while other vehicles or pedestrians cross in front of the vehicle equipped with the signal.

It is extremely difficult for the driver of a vehicle to indicate to drivers of other vehicles and pedestrians that he plans on waiting while the other vehicles or pedestrians cross in front of his vehicle and much confusion occurs as a result thereof causing delays in the movement of traffic, both pedestrian and vehicle, and more important sometimes resulting in serious accidents.

Accordingly, it is a primary object of the present invention to provide an illuminated signal mounted so that it can be readily seen by operators of other vehicles and pedestrians disposed on either side of and to the front of the vehicle equipped with the signal, and which signal can be readily operated by the vehicle operator simultaneously with applying the foot brake so as to indicate to pedestrians and vehicle operators not only that the driver of the vehicle equipped with the signal has his brakes applied but also that he intends to wait while other vehicles and pedestrians cross in front of his vehicle.

Still another object of the invention is to provide a crossing signal of the character described having a switch so arranged that the brakes of the vehicle can be readily applied by the foot brake without actuating the signal or in conjunction with the actuation of the signal.

Another object of the invention is to provide a crossing signal which after having been energized, if thereafter de-energized by the vehicle operator will immediately indicate to pedestrians and operators of other vehicles that the vehicle equipped with the signal is about to be driven ahead and so that pedestrians and other vehicle operators will thus be given a few seconds warning frequently making it possible to avoid a collision or the risk of a pedestrian being struck by the vehicle.

Various other objects and advantages of the invention will hereinafter become more fully apparent from the following description of the drawing, illustrating a presently preferred embodiment thereof, and wherein:

Figure 1 is a side elevational view of the forward portion of an automobile showing the crossing signal mounted thereon;

Figure 2 is a fragmentary side elevational view, partly in section, showing the switch of the crossing signal mounted in a preferred position on the vehicle foot brake;

Figure 3 is a fragmentary front elevational view of the vehicle foot brake with the signal switch mounted thereon;

Figure 4 is an enlarged side elevational view, partly in vertical section, of the crossing signal, and Figure 5 is an enlarged fragmentary side elevational view partly in section and partly diagrammatic showing the signal switch applied to the foot brake and diagrammatically illustrating the electric circuit of the crossing signal.

Referring more specifically to the drawing, the crossing signal in its entirety and comprising the invention is designated generally 7 and includes an electric socket 8 which is adapted to be mounted on the downwardly and forwardly sloping forward portion of the engine hood 9 of a motor vehicle, such as an automobile, the forward portion of which is illustrated in Figure 1 and designated generally 10. The socket 8 is secured by fastenings 11 to the forward portion of the engine hood 9, said fastenings extending through the base portion 12 of the socket which conformably fits against a part of the hood 9. The light socket 8 has a short upstanding post or standard portion 13 on the upper end of which is detachably mounted a lamp bulb 14. A globe 15 is detachably mounted over the lamp bulb 14 and may be secured to the upper portion of the post 13 in any suitable manner as by a threaded connection 16. The globe 15 is preferably colored green for thus coloring the light rays emitted therethrough from the lamp bulb 14, but may be of any other desired color, or the lamp bulb 14 may be of a desired color, such as green, and the globe 15 left uncolored. The upper portion of the globe 15 when mounted on the post 13 extends upwardly sufficiently so that the upper portion thereof only is visible to the driver of the motor vehicle 10, as indicated by the sight-line 17 of Figure 1.

The crossing signal 7 also includes a switch, designated generally 18, which may assume various forms. For example, the switch preferably includes a housing 19 which is secured by fastenings 20 to the underside of the tread plate or pedal 21 of a conventional foot brake. The housing 19 is preferably formed of an electrical insulating material and includes a wall 22, disposed opposite to the housing wall which is secured to the tread plate 21, and on the inner side of which wall 22 is mounted a stationary electric switch contact 23, which may be supported on a block of electrical insulating material 24. An electrical conductor 25 leads into the housing 19 through an opening 26 thereof and is connected to the stationary contact 23.

A small arcuately curved lever 27 is pivotally mounted at one end thereof at 28 on an ear 29 which is fixed to and extends outwardly from the housing wall 22. The lever 27 extends around an edge portion of the tread plate 21 and terminates at its free end in a small tread plate 30 which is spaced outwardly from the adjacent portion of the tread plate 21 and is preferably disposed somewhat behind the outer surface of said tread plate 21 or of a pad 31, which is fixed to the outer side thereof. An arm 32 is rigidly secured to the switch lever 27 and extends therefrom inwardly through a relatively large opening 33 in the housing wall 22. A movable switch contact 34 is fixed to the inner end of the arm 32 and is movably disposed in the housing 19 for movement into and out of engagement with the stationary contact 23. A pull spring 35 is anchored at one end in the housing 19 and extends therefrom outwardly through the opening 33 and is secured at its opposite end to a portion of the switch lever 27 for urging the switch lever to swing about its pivot 28 toward the housing wall 22 and against a stop 36 which is secured to the housing 19.

The electrical conductor 25 is connected to the stationary contact 23 and leads from the positive side of a source of electric current 37, such as the conventional storage battery of the vehicle 10 which is grounded at 38 to the vehicle frame. The light bulb 14 is interposed in the conduit 25 and a conventional flasher 39 may also be interposed in the conductor 25, as well as a pilot lamp bulb 40, if desired, which may be mounted on the instrument panel of the vehicle 10. The arm 32 and lever 27 are formed of electric conducting material and the lever 27 is grounded by a conductor 41 to the ground 38 formed by the vehicle frame, as by being connected to the foot brake which carries the switch 18.

From the foregoing it will be readily apparent that the operator of the vehicle 10 when approaching an intersection if he intends to stop or slow down sufficiently to allow pedestrians and other vehicles to cross in front of the vehicle 10, when applying the foot brake, may pivot his foot on the pad 31 to swing the toe of the foot, located above the pad 31 and tread plate 21, in the direction as indicated by the arrow 42 in Figure 2 so that the toe of the foot will engage the plate 30 of the lever 27 to swing the lever counterclockwise about its pivot 28 as the brake is applied. As the lever 27 is thus swung counterclockwise as seen in Figures 2 and 5, it will exert an outward pull on the arm 32 which in moving outwardly of the wall 22 will cause the movable contact 34 to engage the stationary contact 23 thereby closing the circuit of the light bulb 14 for energizing said light bulb to illuminate the crossing signal globe 15. With the flasher 39 interposed in the circuit, the light bulb 14 will flash on and off intermittently illuminating the globe 15 for indicating to pedestrians and other vehicle operators that the driver of the vehicle 10 intends to wait while the pedestrians and other vehicles cross in front of the vehicle 10. When pressure is released from the lever portion 30 the pull spring 35 will return the lever 27 to its position of Figure 5 to thus disengage the contact 34 from the contact 23 to thereby break the circuit to the light bulb 14 to thus de-energize the crossing signal 14, 15. This will indicate to pedestrians and other vehicle operators that the operator of the vehicle 10 intends to proceed and ordinarily will provide a short warning period which would not otherwise be available in which the intentions of the operator of the vehicle 10 will be made apparent, which additional warning period will be of material value in avoiding accidents or injuries.

When the operator of the vehicle 10 desires to apply the brakes with the foot pedal and without actuating the crossing signal 8, this can be readily accomplished as illustrated in Figure 2 merely by not rocking the toe of the foot relatively to the pad 31 in the direction as indicated by the arrow 42.

With the globe 15 disposed as illustrated in Figure 1 it will be readily visible to pedestrians and operators of other vehicles in positions to cross in front of the vehicle 10. The uppermost portion of the globe 15 can also be seen by the driver of the vehicle 10 as indicated by the sight-line 17 so that the pilot light 40 may be omitted, if desired. However, the intermittent flash of the signal 30 will not impair the visibility of the driver of the vehicle 10 as the majority of the globe 15 will be beneath his line of sight.

While the switch 18 has been shown with the lever portion 30 disposed above the foot pedal or tread pedal 21, the switch housing 19 could obviously be mounted in any desired position on the underside of the plate 21 for locating the lever portion 30 beyond either the inner or outer end of the tread plate 21 or beneath said tread plate, rather than thereabove, depending upon which position was most convenient to the vehicle operator. Likewise, the construction of the lamp socket 8, globe 15 and switch 18 may obviously be varied as only one preferred form thereof has been disclosed, and various other modifications and changes are likewise contemplated and may be resorted to, without departing from the spirit or scope of the invention as hereinafter defined by the appended claim.

I claim as my invention:

An electric signal switch for motor vehicles comprising a housing formed of electrical insulating material and having a rear wall disposed against and secured to the underside of a vehicle foot pedal tread plate, said housing having a front wall provided with an opening, a stationary switch contact disposed in the housing and secured to the front wall, means projecting from said front wall, a curved lever having one end pivotally connected to said means and swingably supported thereby externally of the housing for swinging movement toward and away from said front wall, said lever having a small tread plate at its opposite end, an arm fixed to the lever and extending loosely through the front wall opening, a movable contact supported by said arm within the housing for movement toward and away from the stationary contact, spring means connected to the housing and lever and urging the lever toward the housing and the movable contact away from the stationary contact, and a stop secured to the housing and engaging the lever to limit swinging movement of the lever toward the housing under the biasing action of the spring means for positioning the movable contact out of engagement with the fixed contact and for locating the lever tread plate substantially coplanar to and spaced from an upper edge of the foot pedal tread plate.

References Cited in the file of this patent

UNITED STATES PATENTS

| | | |
|---|---|---|
| 1,095,902 | Marston | May 5, 1914 |
| 1,545,908 | Long | July 14, 1925 |
| 1,659,879 | Karras | Feb. 21, 1928 |
| 1,674,592 | Drohen | June 19, 1928 |
| 1,727,522 | Sehlie | Sept. 10, 1929 |
| 2,081,892 | Ford | May 25, 1937 |
| 2,120,288 | McCready | June 14, 1938 |

FOREIGN PATENTS

| | | |
|---|---|---|
| 251,469 | Italy | June 12, 1927 |